Nov. 10, 1953  S. W. ALDERFER  2,658,736
APPARATUS FOR THE MANUFACTURE OF FOAMED PRODUCTS
Filed April 15, 1950  6 Sheets-Sheet 6
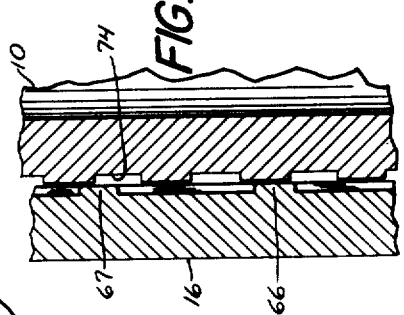
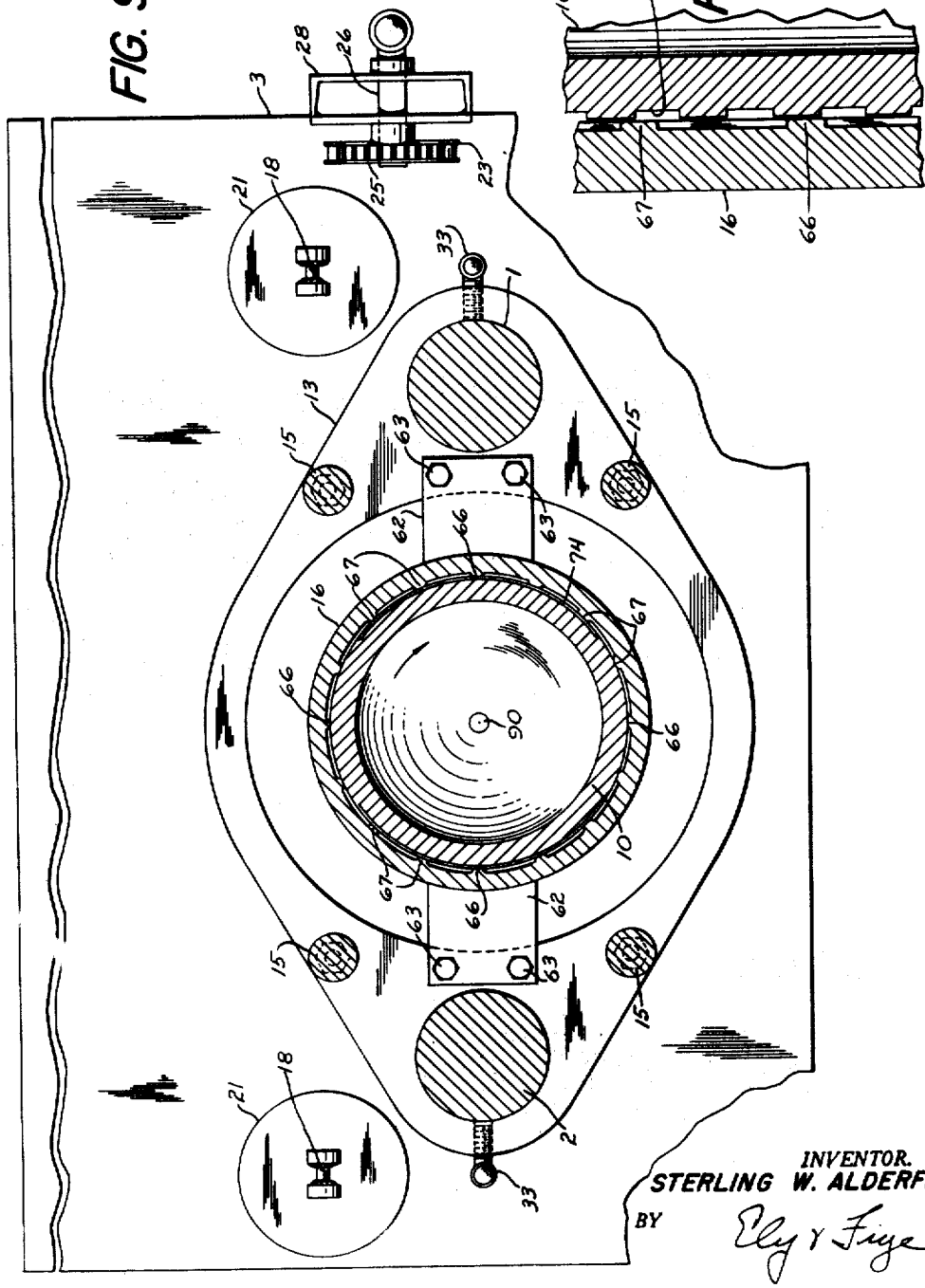
INVENTOR.
STERLING W. ALDERFER
BY
ATTORNEYS Patented Nov. 10, 1953

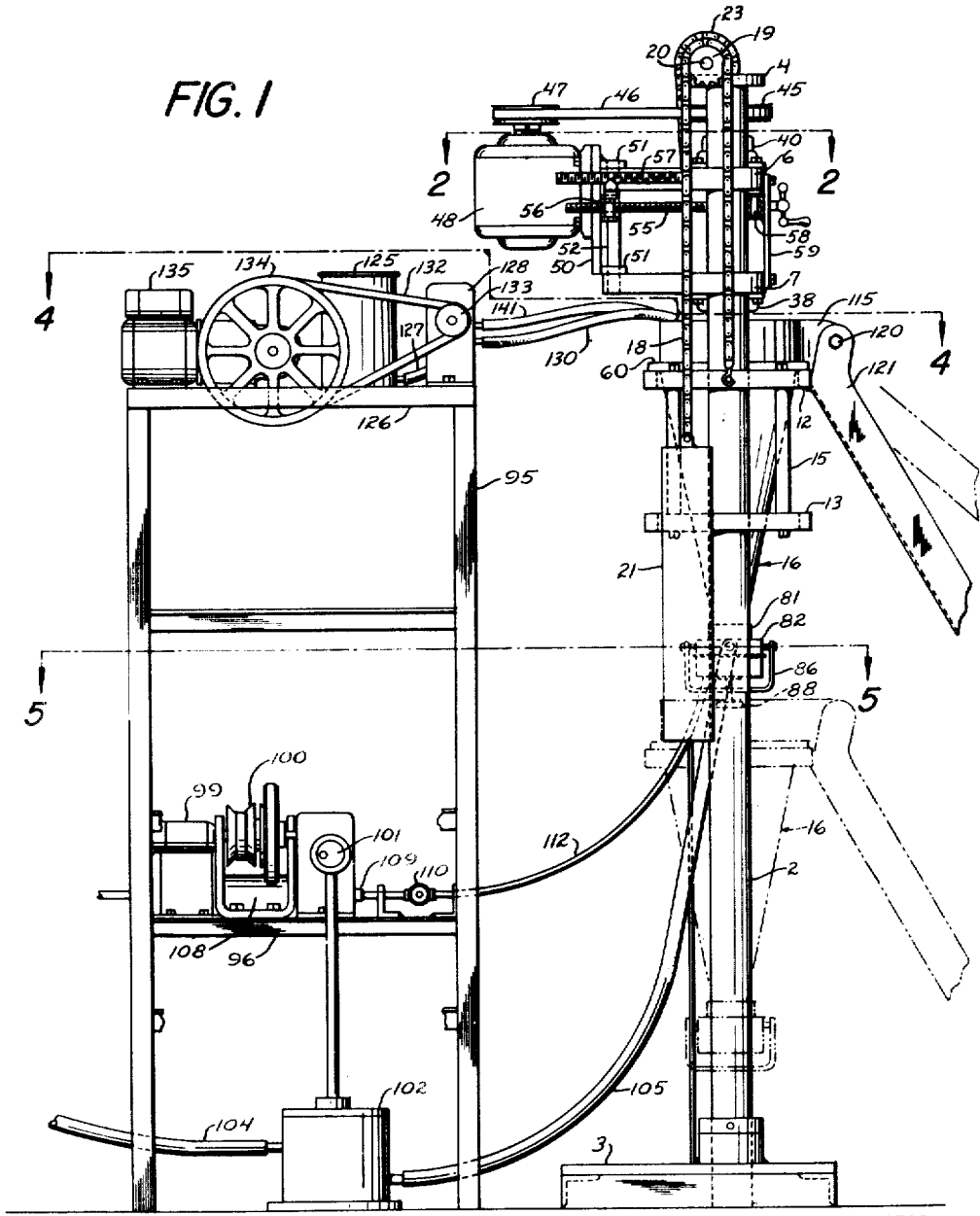

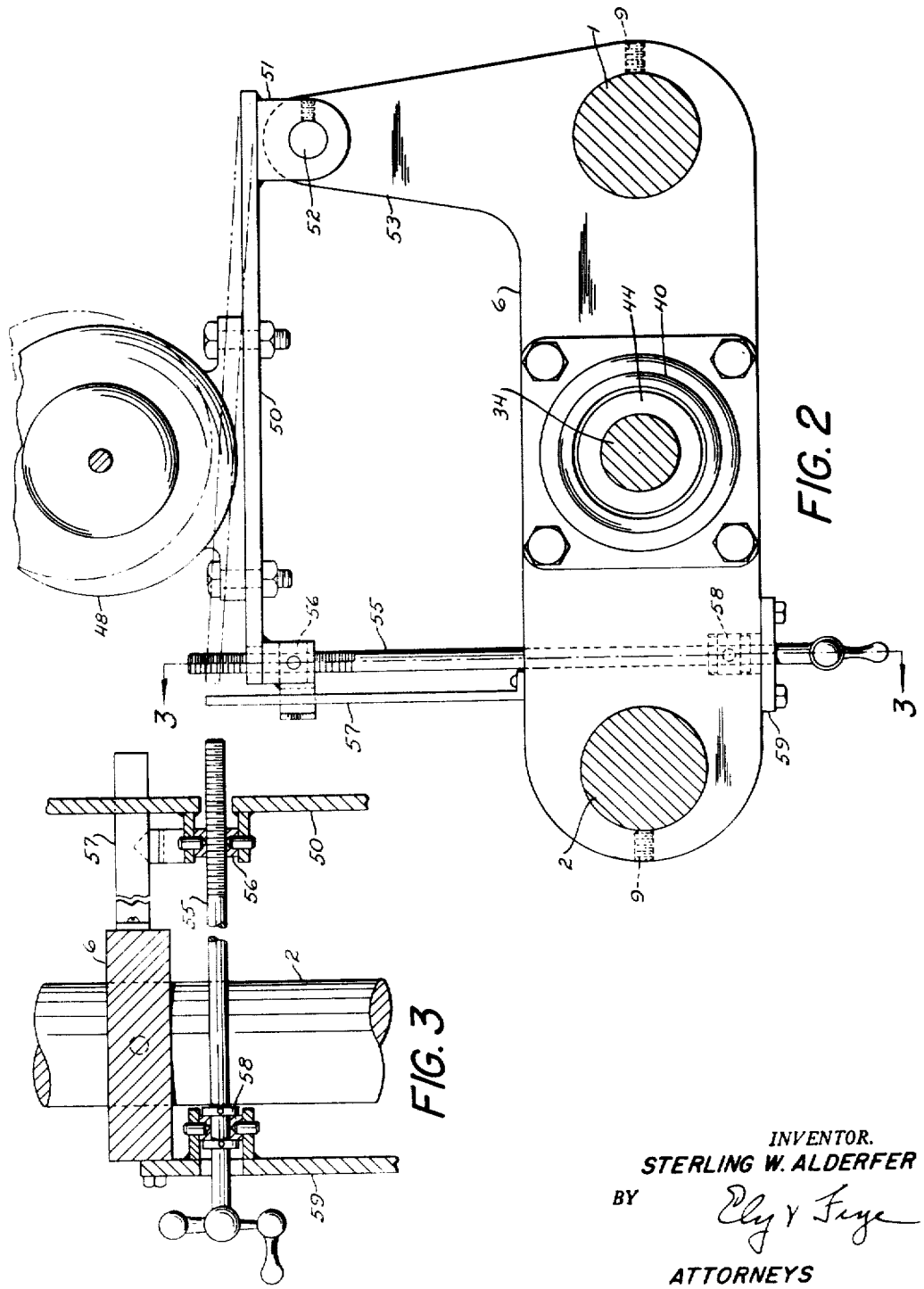

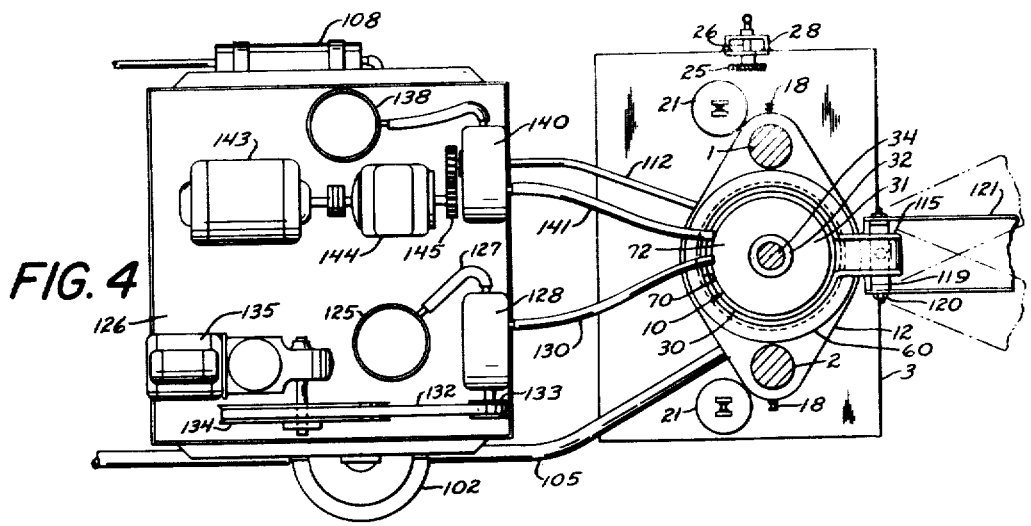
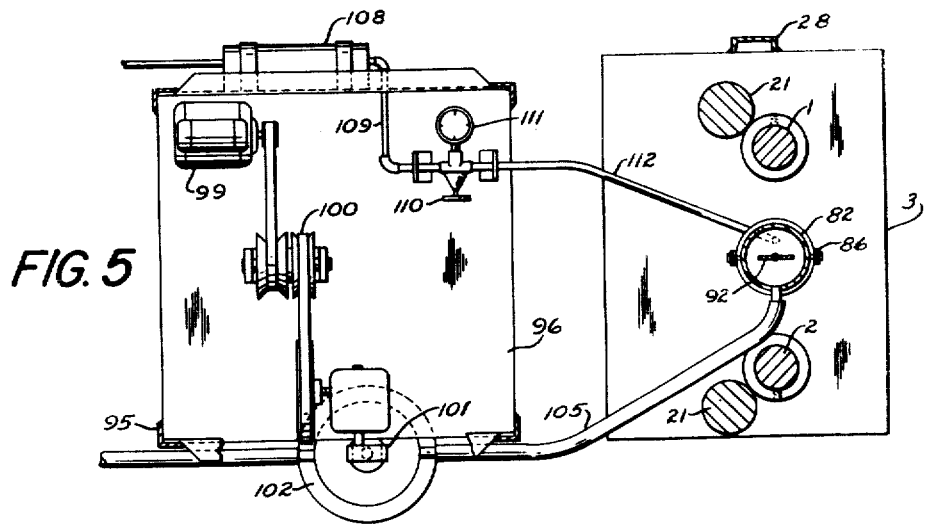
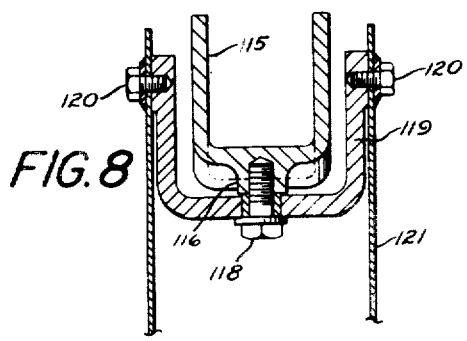

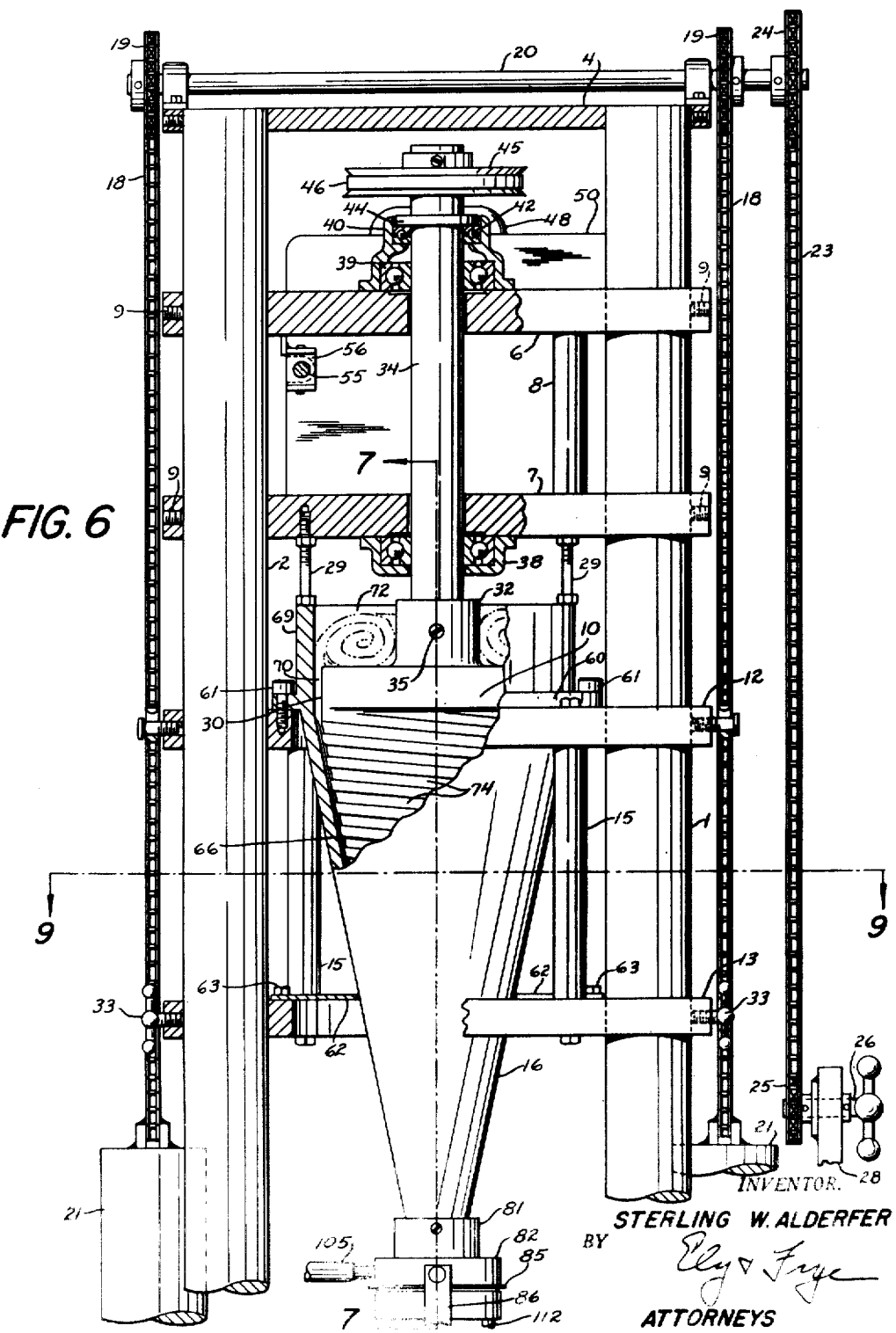

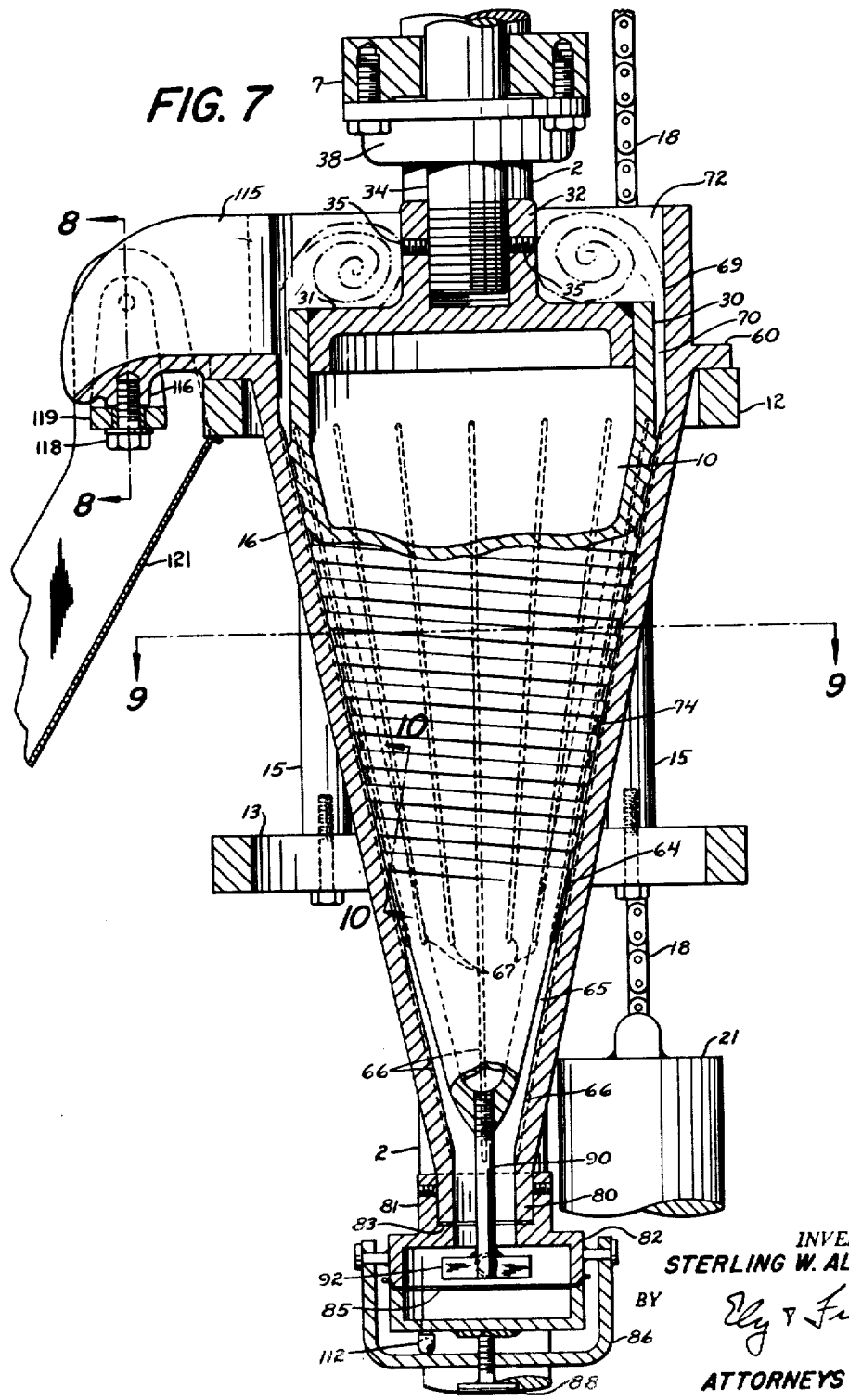

2,658,736

UNITED STATES PATENT OFFICE 2,658,736

APPARATUS FOR THE MANUFACTURE OF FOAMED PRODUCTS

Sterling W. Alderfer, Akron, Ohio, assignor of three-tenths to Edward D. Andrews, Akron, Ohio Application April 15, 1950, Serial No. 156,202

15 Claims. (Cl. 261—93)

The object of the present invention is to improve upon apparatus used in the manufacture of foamed liquid products and, while it has utility in other fields, the particular field of the present invention is to improve upon machines for foaming rubber latex, either natural or artificial. Foamed latex is used extensively in the manufacture of seat cushions, mattresses, paddings of various kinds, and for many other purposes. Latex or other material is usually foamed and aerated in large beaters, which operate upon a batch of latex in a large kettle or drum. This method is very unsatisfactory because of the excessive waste involved in the use of batch methods, the inability to control the product satisfactorily, and the difficulties of getting a uniformly foamed mass.

It has been attempted to replace the batch method by apparatus operating upon a continuously moving stream of latex, but machines of this type have not been perfected to the point where uniformly foamed masses are obtained.

The present invention provides a new type of machine which produces foamed and aerated products at a uniform speed and with a minimum of wastage. The product of the machine shown and described herein is a mass of foamed latex characterized by the presence of minute bubbles or air-cells, uniformly distributed throughout the mass of latex, and by the uniform distribution of the setting or gelling agents, so that the foam properly sets up and cures to provide a foamed product superior to the products produced by known machines.

One of the difficulties attendant upon the production of foamed latex products arises from the necessity of adding setting or gelling agents to the mass of foamed latex at the end of the foaming operation. If the setting or gelling agents are added too soon or if they are not thoroughly distributed through the mass of foamed latex, much of the product will be lost by uneven or premature setting of the stock. If added too late, or without uniform distribution, the foam will tend to collapse.

The apparatus shown and described herein not only produces a superior product but it will produce it continuously as long as the apparatus is operated. Once the apparatus is set in operation, it will run indefinitely, with little attention, and will produce a uniform product at a uniform rate so that the subsequent operations of pouring into molds and setting and curing may be carried on more economically than is possible with existing devices. Among the principal advantages of the apparatus shown and described herein are that it operates with minimum waste of material and the foamed latex does not set prematurely. The foamed product is distinctive by the multiplicity of minute air-cells uniformly distributed throughout the mass.

In the drawings and the description of the apparatus, the best known and preferred embodiment of the invention is disclosed, but it is possible to modify or to improve upon the specific device without departing from the principles of the invention as set forth in the appended claims.

In the drawings:

Fig. 1 is a side elevation of a complete unit for the production of foamed latex or similar products.

Fig. 2 is a horizontal section taken on the line 2—2 of Fig. 1.

Fig. 3 is a section on the line 3—3 of Fig. 2.

Fig. 4 is a horizontal section on the line 4—4 of Fig. 1.

Fig. 5 is a horizontal section on the line 5—5 of Fig. 1.

Fig. 6 is an elevation, partially in section, of the upper part of the machine.

Fig. 7 is a vertical section through the foaming unit, this view being taken on the line 7—7 of Fig. 6.

Fig. 8 is a detail section through the delivery spout taken on the line 8—8 of Fig. 7.

Fig. 9 is a horizontal section through the foaming unit, the location of this view being indicated by the lines 9—9 of Figs. 6 and 7.

Fig. 10 is a full scale cross-section through the surface of the rotor and the adjacent portion of the shell, the location of this view being indicated by the line 10—10 in Fig. 7.

The apparatus comprises a foaming unit and several measuring pumps deliver the latex, the setting and gelling agents at definite rates so that the product is uniform at all times.

The foaming unit is carried by a pair of vertical posts or stanchions 1 and 2, which are set in a base plate 3 and are connected at the top of the unit by a cross plate 4. Below the upper cross plate are the two intermediate plates 6 and 7 connected by posts 8, which form a frame to support the central beater or rotating cone, indicated as a whole by the numeral 10. Plates 6 and 7 are received over the stanchions 1 and 2 and are held thereon by set screws 9.

Slidably mounted on the posts 1 and 2 is a carriage comprised of the upper and lower cross members 12 and 13 connected by the vertical posts 15 to form a support for the outer cone or shell of the foaming unit, indicated as a whole by the numeral 16. The members 12 and 13 slide on the posts 1 and 2 so that the shell may be moved to its lowered position, as shown in dotted lines in Fig. 1, leaving the central rotor or cone and the interior of the shell exposed for cleaning. To raise and lower the outer shell, chains 18 are fixed to the upper slide member 12 and pass over sprockets 19 secured to the end of a shaft 20 across the top of the unit. The ends of the chains are attached to counterweights 21 and the shaft 20 is rotated to raise and lower the shell 16 by a third chain 23 trained over sprocket 24 on the end of the shaft 20 and a second sprocket 25 mounted on manually operated shaft 26 which is rotated in the upper end of a standard 28 rising from the base plate 3 at one side of the unit. The upper limit to which the shell may be moved is determined by the set screws 29 which depend from the cross member 7 and bear against the upper edge of the shell when the shell is raised. Set screws 33 in the cross plate 13, and bearing against the posts 1 and 2, fix the carriage in its raised position.

The rotor or beater 10, which is shown in detail in Figs. 6 and 7, has its main or body portion formed as a hollow, downwardly tapering steel cone, the upper end 30 of which is cylindrical and smooth on its outer surface. In the top of the cone is secured the plate 31 having an upwardly extending socket 32 in which is threaded the vertical power shaft 34. This permits the cone to be adjusted vertically if desired, the location of the cone being fixed by the set screws 35. Shaft 34 rotates in a ball bearing 38, carried on the cross plate 7 and a second ball bearing 39 carried in a housing 40 secured to the top of the cross plate 6. The housing 40 carries a third ball bearing or roller bearing 42 which serves to support the weight of the shaft and rotor by the flange 44 on the shaft. To the upper end of shaft 34 is secured the drive pulley 45 over which is trained the belt 46 which passes over pulley 47 on the motor 48. Preferably the pulleys 45 and 47 are adjustable cone pulleys and the belt 46 is a V-belt, so that the speed of the rotor may be varied. Motor 48 is bolted to a vertical plate 50 which is secured to bearing members 51 that are supported on a vertical shaft 52 in the outer ends of arms 53 extending from the cross plates 6 and 7. This is to permit the necessary adjustment for the variable speed drive for the rotor. A manually operated shaft 55 is threaded at its outer end in the swivelled nut 56 carried by the plate 50 and is rotatably supported in the swivelled bearing 58 carried by a cross plate 59 secured to the cross plates 6 and 7. A gauge 57 carried at the side of the machine indicates the adjustment of the pulleys 45 and 47.

The shell 16 is set in an opening in the upper cross member 12 of the vertically movable carriage by means of a flange 60 through which pass the bolts 61. The lower portion of the cone is held and steadied by shims 62 which are bolted at 63 to the cross member 13 and are provided with arc-shaped inner ends which bear against the shell near its lower end.

Referring to Fig. 7, it will be noted that the major part of the cone or rotor 10 is parallel to the inner surface of the shell 16 but, from a point in the region of the numeral 64, approximately one-fourth of the way up the cone, it tapers inwardly so as to provide a gradually decreasing space 65 between the outside of the cone and the inside of the shell to receive the latex which enters at the bottom of the shell and moves upwardly therein. Over the major portion of the shell, however, the space between the opposing surfaces of the shell and the cone is reduced to a bare clearance, in normal operations not more than .015 of an inch. This space is variable by the adjustment of the stop pins 29, the finer the adjustment between the opposing surfaces the more effective shearing action will be imparted to the latex during its passage through the machine. Within the range of adjustment, a thorough betating and aeration will be given to the latex and the air cells will be minute and better distributed in the foamed product. There is a practical limitation to this clearance because of the vibration of the rotor, but the desideratum is to have as little clearance as may be possible between the opposing surfaces of the cone and the rotor.

In the preferred form of the invention, the inside surface of the shell is channeled to provide a plurality of vertical ribs on the inside of the shell. Four of these ribs are indicated by the numeral 66 extending from the smallest portion or apex of the shell to the upper or discharge end thereof. In the region where the conical surfaces of the rotor and the shell are parallel, additional ribs 67 are provided in the inner wall of the shell, two additional ribs being shown between each pair of ribs 66. These ribs terminate near the upper end of the shell where the wall of the shell is vertical, as shown at 69, and spaced from the portion 30 of the cone to provide a space 70 to receive the foamed latex as it issues from the narrow space between the conical portions of the shell and cone. It will be noted that the wall 69 is considerably higher than the top of the cone to provide a large open receiving chamber 72 into which the foamed latex is delivered.

In the outer surface of the rotor is cut one or more spiral grooves 74, which begin at about the point 64 and extend to the upper or larger end of the cone. The height of the ribs on the shell and the depth of the spiral groove on the rotor may vary. In some cases it may be desirable to provide smooth surfaces on either the rotor or the shell or on both of them.

The cone or rotor is moved in the direction of the arrow in Fig. 9, which is opposed to the direction of the spiral on the cone. In the form of the invention shown in the drawings, the spiral on the cone would tend to force the latex downwardly but, as the latex is impelled upwardly by the force of the incoming latex, the general direction of the latex is upwardly and the opposing forces of the spiral on the cone serve to churn it completely and thoroughly. In standard operations with this type of foamer, the cone is rotating at 500 R. P. M., which creates a very violent churning of the latex. In normal operations, latex is passed through the foamer at the rate of 3½ lbs. per minute.

Fig. 10 is a full scale drawing giving the details of a specific type of ribbed formation for the shell and the cone. While the foaming unit made in accordance with this plan has been found to give excellent results, the information given is merely directive. In this view, the width of the spiral groove on the rotor is ⅜ inch and the width of the spiral rib is ¼ inch. The depth of the groove is ₁₆ inch. The width of one of the ribs on the shell is ₁₆ inch, the spacing between the ribs being variable as the shell expands. The ribs on the shell are of approximately the same height as the spiral rib on the rotor. The spacing between the top of the rib on the rotor and the tops of the ribs on the shell is .015 inch. The edge of all the ribs are shown as sharp and well defined, but this is not important as the sides of the ribs may be tapering.

The number of ribs and grooves, the dimensions thereof, and the relative locations thereof may be varied and it is not the intention to be limited to any of these details. The success of the apparatus seems to lie in the combined churning action and the rubbing or shearing action which the latex receives in its passage upwardly through the foaming unit. As the latex is intimately mixed with a large volume of air as it enters the unit, the combination of these forces creates a multitude of minute bubbles, thoroughly and uniformly distributed throughout the latex.

The lower end or apex of the shell terminates in a neck 80 about which is fitted a sleeve 81 extending upwardly from a preliminary mixing and feed chamber 82 fastened to the neck of the shell with a tight joint, indicated by the packing 83. This chamber is divided into an upper and lower portion separated by an air-permeable dam or diaphragm 85, clamped between the two sections of the chamber by a strap 86 carried on the upper half of the chamber and a thrust screw 88 bearing against the lower half of the chamber. Latex is received in the upper part of the chamber and air under pressure is received in the lower half of the chamber. The diaphragm 85 should not permit latex to pass into the lower section of the chamber but should allow the air to pass up through the diaphragm and into the latex. Several fine mesh screens and fabrics have been tried for the diaphragm, the material which has been found to best serve the purpose being a finely woven nylon sheeting. This material offers the best resistance to the downward escape of latex, with the least resistance to the upward passage of air into the latex above the diaphragm.

While the fine meshes of the diaphragm 85 give a rather thorough dissemination of air in the latex, it has been found desirable to supplement this action by a mechanical stirring. This is done in the form shown in the drawings by inserting a threaded vertical shaft 90 in the apex of the rotor, the lower end of the shaft extending into the upper portion of the chamber 82 where it carries a vane or paddle 92, which serves to give a preliminary beating to the body of latex and air just before it moves upwardly through the neck 80 into the space 65. With a flow of latex into the foamer at the rate of 3½ lbs. per minute, it has been found that air introduced at the rate of .2 cubic foot per minute will give excellent results. The amounts and proportions are variable and under the direct control of the operator, so that exact predetermined proportions and hence uniformity of product may be obtained.

The instrumentalities for delivering the latex, air, and other ingredients at the uniform rate are carried on a stand 95 located at the side of the foaming unit. At one level on this stand is the shelf 96 on which is mounted a motor 99 which, through the belting indicated at 100, drives the eccentric 101 which operates the latex pump 102. The drive 100 is of the usual V-belt and adjustable cone pulley type, as indicated in the drawings, so that the rate at which the latex is delivered by the measuring pump 102 to the chamber 82 may be controlled with a fine degree of accuracy.

Latex such as suitable for the purpose should contain from 50% to 60% of solids, the usual proportion of solid content being about 57%. As it is delivered to the foaming apparatus, it may be compounded in accordance with any of the well known formulations for the manufacture of sponge rubber. It should contain the usual aging and vulcanizing ingredients as well as a foaming agent. Pigments and loading material may be added if desired.

The latex, compounded as desired, is conducted from a source of supply to the pump 102 through the conduit 104 and is conducted from the pump to the upper part of chamber 82 by the flexible pipe 105.

Air is supplied from a constant pressure tank 108, which delivers through the line 109 having a regulatable valve 110. A gauge 111 indicates the amount of air passing through the valve to the line 112 which delivers the air to the lower part of the chamber 82 below the diaphragm 85.

The foamed latex passes out over the top of the cone into the space 72 in a continuous stream. This space is surrounded by the wall 69 which is open at one point where the wall is provided with an opening from which extends the trough-shaped delivery spout 115. The underside of this spout is provided with a lug 116, to which is attached by the bolt 118 a U-shaped bracket 119. To this bracket is pivoted at 120 a delivery chute or trough 121, down which the foamed and treated latex flows to the molds or other instrumentality in which it is formed and vulcanized into the final product.

The upward movement of the body of latex causes it to roll upon itself in a doughnut shaped mass, which also rotates upon its own axis due to the movement of the rotor. These forces cause the body of foamed latex to be in constant agitation. The fact that the body of foamed latex is constantly milling about in the space 72 affords an excellent opportunity to add the setting or gelling agents immediately after the foaming operation and just before the foam is delivered for its subsequent treatment. The gelling agents and an additional vulcanizing ingredient such as zinc-oxide, added at this point, are thoroughly mixed with the body of foamed latex before any part thereof spills out through the spout 115. In practice, there will always be a substantial body of foamed latex milling about in the space 72 and some of it will be flowing out of the spout in a continuous stream.

Setting or gelling agents, their properties, and the requirements thereof are well known to those familiar with the art. Some rubber chemists prefer to use either sodium or potassium silicofluoride, usually the former. The proportions of the materials added at this point should be carefully controlled in accordance with the volume and composition of the main body of latex. In the form of foaming unit here illustrated, provision is made for the addition of carefully measured quantities of both gelling agents.

Referring to Fig. 4, a zinc oxide solution is maintained in the pot 125 mounted on a plate 126 at the top of the frame 95. A conduit 127 leads to a measuring pump 128, which delivers a measured quantity of the zinc oxide through a delivery pipe 130, which discharges on the top of the milling body of latex in the space 72. The pump 128 is driven by the V-belt 132, which is trained over the adjustable pulley 133 on the shaft of the pump and over a second adjustable pulley 134 driven by the motor 135 mounted on the plate 126. By adjusting the pulleys the amount of zinc oxide which is delivered to the latex will be carefully measured for the requirements of the latex sponge.

The pot 138, also carried on the plate 126, contains the other gelling agent which is delivered to the measuring pump 140, which in turn delivers that agent to the mass of sponged latex in the space 72 through the pipe 141. The measuring pump 140 is driven by the motor 143 through an adjustable transmission contained in the housing 144 and through the intermeshing gears 145.

The operation of the apparatus will be clear from the foregoing, it being necessary only to call attention to the fact that the prepared latex, air, gelling agent, and zinc oxide are all delivered in exact measured quantities so that the composition of the resulting product is always under control and uniform structure of the foamed product is assured. The beater or rotor working in combination with the shell serves, through the peculiar shearing action, to distribute the air thoroughly through the latex, and the foamed latex flows out of the machine in a steady stream of substantially uniform volume. A machine of the size and operating under the conditions specified will deliver foamed latex of exceptionally high quality and uniformity at the rate of two gallons a minute. The figures which have been given are illustrative only and the production may be increased or diminished. As the gelling agent and zinc oxide are delivered at the critical time after the foam has been created and just before it is delivered to the molding and vulcanizing apparatus, there is no waste of the product by premature gelling or by gelling of the foamed latex while it is in the beating stage. The device is easy to clean out after the completion of a run and the loss which is encountered in older forms of foaming devices, due to residues left in the beater or by spilling over from the kettles, is eliminated. Once the apparatus is adjusted it requires little attention to insure the steady production of latex foam.

While the invention has been described in sufficient detail so that the principles thereof can be understood, specific details need not be adhered to in embodiments of the invention.

What is claimed is:

1. An apparatus for aerating and beating a liquid such as rubber latex comprising a conical rotor and a conical shell surrounding the rotor, means for driving the rotor, the surface of the rotor and the opposing surface of the shell being formed with ribs which cross one another, the tops of the opposing ribs being closely spaced so that liquid passing between them will be subjected to a shearing action, and means for introducing a continuously flowing stream of fluid and air into the apex of the shell.

2. An apparatus for aerating and beating a liquid such as rubber latex comprising a conical rotor and a conical shell surrounding the rotor, means for driving the rotor, the surface of the rotor and the opposing surface of the shell being formed with ribs which cross one another, the tops of the opposing ribs being closely spaced so that liquid passing between them will be subjected to a shearing action, means for introducing measured quantities of liquid and air into the apex of the shell, and means for mixing the liquid and the air before it enters the shell.

3. An apparatus for the manufacture of sponged latex comprising a beater, a shell surrounding the beater, raised formations on the inner wall of the shell and on the surface of the beater, the tops of said opposing formation being closely spaced so that latex passing between them will be subjected to a shearing action, means for rotating the beater with respect to the shell, a chamber connecting with the shell at one point, means to supply measured quantities of latex and air to the said chamber and thence to the space between the shell and the beater, a second chamber communicating with the shell at a point opposite the first named chamber to receive the foamed latex, and means for adding a measured quantity of a gelling agent to the foamed latex in the second chamber.

4. An apparatus for the manufacture of sponged latex comprising a rotor, a shell surrounding the rotor, the surface of the shell having a plurality of raised longitudinal ribs and the surface of the rotor having a spiral rib formed therein, the tops of the ribs being in close proximity to create a shearing action on the latex, means for delivering latex and air in a continuous stream to one end of the shell and causing it to flow into the space between the shell and the rotor, and means for driving the rotor in a direction so that pitch of the spiral rib tends to propel the latex in the direction opposite to the direction of its flow.

5. An apparatus for the manufacture of sponged rubber latex comprising a conical rotor, a conical shell surrounding the rotor, the surface of the shell and the surface of the rotor passing in close proximity to one another, means for driving the rotor, a chamber communicating with the apex of the shell, means for delivering measured quantities of latex and air to the chamber and thence to the space between the shell and the rotor, means on the rotor tending to propel the latex passing between the shell and the rotor toward the apex of the shell, and means for adjusting the space between the surface of the shell and the surface of the rotor.

6. An apparatus for the manufacture of sponged rubber latex comprising a conical rotor, a conical shell surrounding the rotor, the surface of the shell and the surface of the rotor having opposed intersecting raised formations, the tops of said opposing formations being in close proximity to form a plurality of separate, individual, restricted passages so that latex passing through the space between the shell and the rotor is subjected to a shearing action, means for driving the rotor, a chamber communicating with the apex of the shell, means for delivering measured quantities of latex and air to the chamber and thence to the space between the shell and the rotor, and means to deliver a measured quantity of a gelling agent to the foamed latex as it issues from the space between the rotor and the shell.

7. An apparatus for the manufacture of sponged rubber latex comprising a conical rotor, a conical shell surrounding the rotor, the surface of the shell and the surface of the rotor having opposed intersecting raised formations, the opposing surfaces of said formations being closely spaced to afford a multiplicity of restricted passages to create shearing action on the solid particles of the latex, means for driving the rotor, a chamber communicating with the apex of the shell, and means for delivering measured quantities of latex and air to the chamber and thence to the space between the shell and the rotor.

8. An apparatus for the manufacture of sponged rubber latex comprising a rotor, a shell surrounding the rotor, the surface of the shell and the surface of the rotor having opposed intersecting raised formations, the tops of said formations being in close proximity to form a plurality of restricted passages so that latex passing through the space between the shell and the rotor is subjected to a multiplicity of individual shearing operations, means for driving the rotor, a chamber communicating with the apex of the shell, and means for delivering measured quantities of latex and air to the chamber and thence to the space between the shell and the rotor.

9. An apparatus for the manufacture of aerated and foamed liquid latex comprising a rotor and a shell closely spaced from and surrounding the rotor, means to drive the rotor, a chamber in communication with the shell, a finely woven nylon sheeting located in the chamber and constituting a porous partition dividing it into two sections, and means for delivering measured quantities of the liquid latex into one section and measured quantities of air into the other section.

10. An apparatus for the manufacture of an aerated and foamed liquid comprising a rotor, a shell surrounding the rotor, said shell and rotor having beating formations on their opposed surfaces, a chamber, means to deliver air and liquid in measured streams to the chamber, means in the chamber to mix the air and liquid, and a passage to conduct the mixed air and liquid from the chamber to the shell and thence to the space between the shell and the rotor, the formations on the rotor being designed and adapted to urge the latex toward the chamber.

11. An apparatus for the manufacture of sponged rubber latex comprising a conical rotor, a conical shell closely surrounding the rotor, said shell and rotor having raised beating formations on their opposed surfaces, a chamber in communication with the apex of the shell, means to deliver separate measured streams of air and latex to the chamber, means in the chamber to mix the air and latex, and a second chamber at the delivery end of the rotor to receive and hold a mass of the foamed latex, the base of the second chamber being the top of the rotor, and means to deliver a measured stream of a gelling agent to the second chamber.

12. Apparatus as described in claim 11 in which the means to mix the air and the latex comprises a fine woven nylon sheeting permeable to air through which the air passes into the latex.

13. In an apparatus for beating and aerating rubber latex comprising a rotor and an outer casing surrounding the rotor, means to drive the rotor, said rotor and casing having raised intersecting ribs on their opposed surfaces forming a multiplicity of separated narrow passages, means for introducing a mixture of air and latex into the space between the rotor and the casing, the spacing between the tops of said ribs being of a degree to create a shearing action upon the latex passing between them.

14. In an apparatus for beating and aerating rubber latex comprising a rotor and an outer casing surrounding the rotor, means to drive the rotor, said rotor and casing having raised intersecting ribs on their opposed surfaces forming a multiplicity of separated narrow passages, means for introducing a mixture of air and latex into the space between the rotor and the casing, the spacing between the tops of said ribs being of a degree to create a shearing action upon the latex passing between them, and means to adjust the space between the tops of said formations.

15. In an apparatus for beating and aerating rubber latex comprising a rotor and an outer casing surrounding the rotor, a chamber in communication with said casing, a partition in said chamber dividing it into two sections one of which communicates with said casing, the partition being of material permeable to air and impermeable to rubber latex, and means for delivering measured quantities of the latex to the section communicating with said casing and measured quantities of air to the other section.

STERLING W. ALDERFER.

References Cited in the file of this patent

UNITED STATES PATENTS

| Number | Name | Date |
|---|---|---|
| 856,731 | Saaler | June 11, 1907 |
| 1,174,737 | Kollberg | Mar. 7, 1916 |
| 1,612,625 | Ferguson | Dec. 28, 1926 |
| 1,852,447 | Chapman | Apr. 5, 1932 |
| 2,114,275 | Murphy | Apr. 12, 1938 |
| 2,295,740 | Keen | Sept. 15, 1942 |
| 2,314,131 | De Csaby | Mar. 16, 1943 |
| 2,335,339 | Keen | Nov. 30, 1943 |
| 2,435,884 | Galewski | Feb. 10, 1948 |

FOREIGN PATENTS

| Number | Country | Date |
|---|---|---|
| 129,757 | Great Britain | Dec. 11, 1918 |

Dedication 2,658,736.—*Sterling W. Alderfer*, Akron, Ohio. APPARATUS FOR THE MANUFACTURE OF FOAMED PRODUCTS. Patent dated Nov. 10, 1953. Dedication filed Jan. 21, 1960, by the assignee, *The Kendall Company*.

Hereby dedicates to the public the entire terminal portion of the term of said patent.

[*Official Gazette March 1, 1960.*]

8. An apparatus for the manufacture of sponged rubber latex comprising a rotor, a shell surrounding the rotor, the surface of the shell and the surface of the rotor having opposed intersecting raised formations, the tops of said formations being in close proximity to form a plurality of restricted passages so that latex passing through the space between the shell and the rotor is subjected to a multiplicity of individual shearing operations, means for driving the rotor, a chamber communicating with the apex of the shell, and means for delivering measured quantities of latex and air to the chamber and thence to the space between the shell and the rotor.

9. An apparatus for the manufacture of aerated and foamed liquid latex comprising a rotor and a shell closely spaced from and surrounding the rotor, means to drive the rotor, a chamber in communication with the shell, a finely woven nylon sheeting located in the chamber and constituting a porous partition dividing it into two sections, and means for delivering measured quantities of the liquid latex into one section and measured quantities of air into the other section.

10. An apparatus for the manufacture of an aerated and foamed liquid comprising a rotor, a shell surrounding the rotor, said shell and rotor having beating formations on their opposed surfaces, a chamber, means to deliver air and liquid in measured streams to the chamber, means in the chamber to mix the air and liquid, and a passage to conduct the mixed air and liquid from the chamber to the shell and thence to the space between the shell and the rotor, the formations on the rotor being designed and adapted to urge the latex toward the chamber.

11. An apparatus for the manufacture of sponged rubber latex comprising a conical rotor, a conical shell closely surrounding the rotor, said shell and rotor having raised beating formations on their opposed surfaces, a chamber in communication with the apex of the shell, means to deliver separate measured streams of air and latex to the chamber, means in the chamber to mix the air and latex, and a second chamber at the delivery end of the rotor to receive and hold a mass of the foamed latex, the base of the second chamber being the top of the rotor, and means to deliver a measured stream of a gelling agent to the second chamber.

12. Apparatus as described in claim 11 in which the means to mix the air and the latex comprises a fine woven nylon sheeting permeable to air through which the air passes into the latex.

13. In an apparatus for beating and aerating rubber latex comprising a rotor and an outer casing surrounding the rotor, means to drive the rotor, said rotor and casing having raised intersecting ribs on their opposed surfaces forming a multiplicity of separated narrow passages, means for introducing a mixture of air and latex into the space between the rotor and the casing, the spacing between the tops of said ribs being of a degree to create a shearing action upon the latex passing between them.

14. In an apparatus for beating and aerating rubber latex comprising a rotor and an outer casing surrounding the rotor, means to drive the rotor, said rotor and casing having raised intersecting ribs on their opposed surfaces forming a multiplicity of separated narrow passages, means for introducing a mixture of air and latex into the space between the rotor and the casing, the spacing between the tops of said ribs being of a degree to create a shearing action upon the latex passing between them, and means to adjust the space between the tops of said formations.

15. In an apparatus for beating and aerating rubber latex comprising a rotor and an outer casing surrounding the rotor, a chamber in communication with said casing, a partition in said chamber dividing it into two sections one of which communicates with said casing, the partition being of material permeable to air and impermeable to rubber latex, and means for delivering measured quantities of the latex to the section communicating with said casing and measured quantities of air to the other section.

STERLING W. ALDERFER.

References Cited in the file of this patent

UNITED STATES PATENTS

| Number | Name | Date |
|---|---|---|
| 856,731 | Saaler | June 11, 1907 |
| 1,174,737 | Kollberg | Mar. 7, 1916 |
| 1,612,625 | Ferguson | Dec. 28, 1926 |
| 1,852,447 | Chapman | Apr. 5, 1932 |
| 2,114,275 | Murphy | Apr. 12, 1938 |
| 2,295,740 | Keen | Sept. 15, 1942 |
| 2,314,131 | De Csaby | Mar. 16, 1943 |
| 2,335,339 | Keen | Nov. 30, 1943 |
| 2,435,884 | Galewski | Feb. 10, 1948 |

FOREIGN PATENTS

| Number | Country | Date |
|---|---|---|
| 129,757 | Great Britain | Dec. 11, 1918 |

Dedication 2,658,736.—*Sterling W. Alderfer*, Akron, Ohio. APPARATUS FOR THE MANUFACTURE OF FOAMED PRODUCTS. Patent dated Nov. 10, 1953. Dedication filed Jan. 21, 1960, by the assignee, *The Kendall Company*.

Hereby dedicates to the public the entire terminal portion of the term of said patent.

[*Official Gazette March 1, 1960.*]

Dedication 2,658,736.—*Sterling W. Alderfer*, Akron, Ohio. APPARATUS FOR THE MANUFACTURE OF FOAMED PRODUCTS. Patent dated Nov. 10, 1953. Dedication filed Jan. 21, 1960, by the assignee, *The Kendall Company*.

Hereby dedicates to the public the entire terminal portion of the term of said patent.

[*Official Gazette March 1, 1960.*]